Patented July 29, 1947

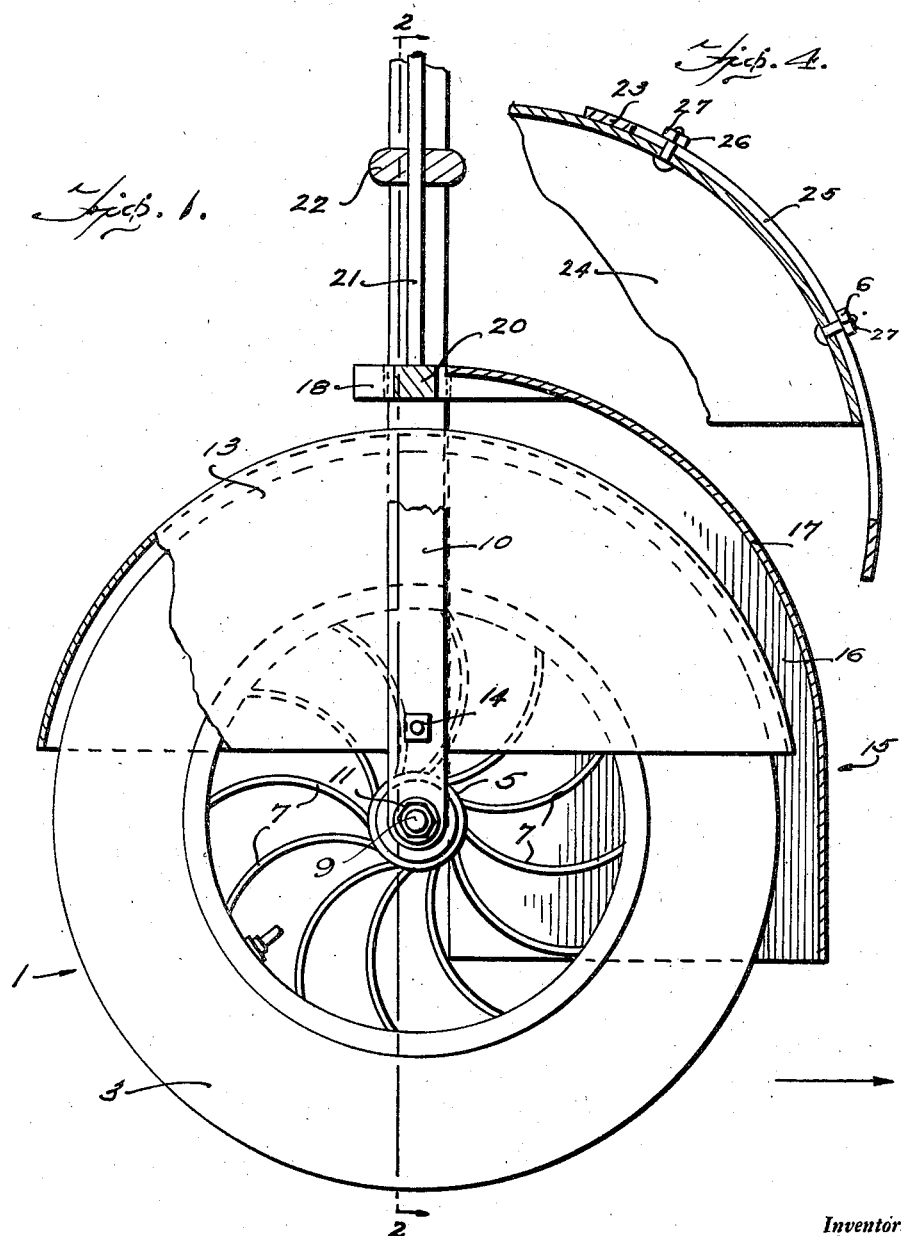

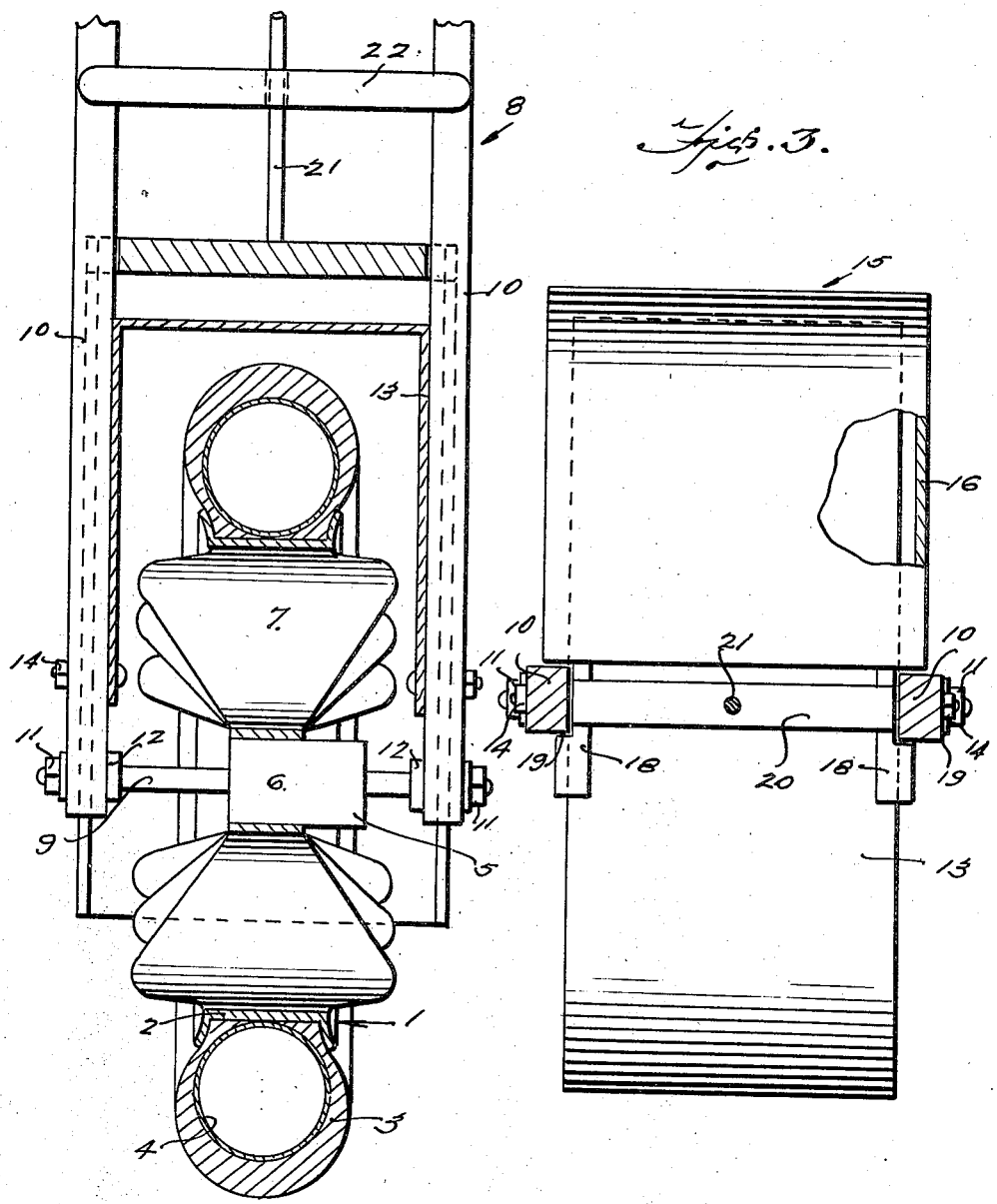

2,424,941

UNITED STATES PATENT OFFICE 2,424,941

WHEEL GEAR

Rawley H. Musser and Luster J. White,
Salem, Va.

Application August 2, 1944, Serial No. 547,726

2 Claims. (Cl. 244—103)

Our invention relates to improvements in wheel gear for use more particularly as landing wheel gear for airplanes, although, as will presently appear, the invention is well adapted for use on automobiles and the like.

The primary object of the invention is to provide simply constructed, inexpensive, practical wheel gear which, when used as airplane landing gear, is adapted to be wind driven in the proper direction for landing as a safety provision to prevent nosing over and to save rubber and tires, and which, when used as automobile wheel gear, will function similarly and thereby increase speed, provide for economy in the use of fuel, and also cool and prolong the life of the tires.

Other and subordinate objects are also comprehended by our invention, all of which, together with the precise nature of our improvements, will be readily understood when the succeeding description and claims are read with reference to the drawings accompanying and forming part of this specification.

In said drawings:

Figure 1 is a view partly in side elevation and partly in vertical section of our improved wheel gear in its preferred embodiment, Figure 2 is a view in vertical section taken substantially on the line 2—2 of Figure 1, Figure 3 is a view in horizontal section taken on the line 3—3 of Figure 2, and Figure 4 is a view in vertical section of a modified embodiment of the invention.

Referring to the drawings by numerals, our improved wheel gear, in its preferred embodiment, as shown in Figures 1 to 3, comprises a wheel 1 including a rim 2, of the usual channel type, for mounting the usual pneumatic tire 3 equipped with the inner tube 4, a cylindrical axial brake drum 5, an annular hub 6 narrower than the length of the brake drum 5 and secured on one end of said drum, as by welding, not shown, and a plurality of spoke-forming vanes integral with the hub 6 and rim 2, said vanes 7 flaring edgewise from said hub 6 to adapt the same to extend beyond the sides of the rim 2 and the side walls of the tires 3. As best shown in Figure 1, the vanes 7 are bowed longitudinally in the direction of rotation of the wheel 1 when the wheel is rotated in the normal direction.

The described wheel 1 is preferably mounted in a fork 8 on a cross shaft 9 extending between the lower ends of the legs 10 of said fork and suitably secured to said ends by nuts 11 clamping said legs 10 between the same and fixed collars 12 on said shaft. The shaft 9 extends through the brake drum 5 which may be suitably mounted on the shaft for rotation thereon and against endwise play as desired.

A shell-like mud guard 13 of rectangular form in cross section and segmental form in longitudinal section is fitted between the legs 10 of the fork 8 over the upper portion of the wheel 1 and suitably bolted to said legs 10, as at 14.

A wind guard 15 of shell-like form with vertical side walls 16 and an upwardly and rearwardly curving front wall 17 straddles the mud guard 13 and the wheel 1 forwardly of the fork 8, said guard 15 being adapted to extend below the horizontal center of the wheel 1. The wind guard 15 is fixed at its rear upper edge on a pair of horizontal arms 18 interposed between the legs 10 of the fork 8 and having shoulders 19 adapted to engage the rear sides of the legs 10 to prevent the wind guard 15 from moving forwardly of the fork 8. A cross bar 20 connects the arms 18 between the legs 10 of the fork 8 and has fixed in the center thereof a rod 21 extending upwardly through and slidable in a cross bar 22 extending between the legs of the fork 8 above the bar 20 and suitably fixed to said legs. As will be seen, the wind guard 15 is suspended by the rod 21 and may be adjusted vertically by raising and lowering said rod. Any suitable means, not shown, may be provided for operating the rod 21.

In the modified embodiment of the invention shown in Figure 4 a curved plate-like wind guard 23 is provided in lieu of the wind guard 15 and which is vertically adjusted on the front end of the mud guard 24 by means of a longitudinal slot 25 in said plate and bolts 26 extending through said mud guard and slot 25 and equipped with nuts 27.

The operation of our invention will be readily understood. When the described wheel gear is used as airplane landing wheel gear, under forward travel of the airplane, the vanes 7 function as scoops below the wind guard 15 whereby the wheel is wind propelled to rotate in the proper direction for landing. By adjusting the wind guard 15 vertically, the area of the vanes which will be exposed below said guard 15 may be varied so that the wheel 1 will be rotated at different speeds as occasion may require. The wind guard 23, as will be understood, functions in the same manner as the wind guard 15. When the wheel gear is used on an automobile and the wheel 1 is traveling forwardly, the vanes tend to function in the same manner and thereby increase the speed of rotation of the wheel, the wind playing against the vanes 7 being deflected off the same around the tire 3, thereby facilitating maintaining said tire cool. The brake drum 5 may be utilized in conjunction with any suitable form of brake mechanism.

The foregoing will, it is believed, suffice to impart a clear understanding of our invention, together with the advantages thereof, without further explanation.

Manifestly, the invention, as described, is susceptible of modification in other respects than as herein disclosed, without departing from the inventive concept, and right is herein reserved to such modifications as fall within the scope of the appended claims.

What we claim is:

1. A wheel for use on landing gear of an airplane and rotation by air pressures caused by flight of the airplane comprising a rim, a hub, and vanes connecting said rim and hub and each having the form of an isosceles trapezoid and a longitudinally curving spoke, said vanes flaring edgewise toward said rim and having side edge portions extending outwardly beyond the sides of the rim, said portions gradually increasing in width toward said rim.

2. A wheel for use on landing gear of an airplane and rotation by air pressure caused by flight of the airplane comprising a rim, a hub, and vanes connecting said rim and hub and each having the form of an isosceles trapezoid and a longitudinally curving spoke, said vanes flaring edgewise toward said rim and having side edge portions extending outwardly beyond the sides of the rim, said portions gradually increasing in width toward said rim, said vanes between said portions and the hub lying between the planes of the sides of the rim.

RAWLEY H. MUSSER.
LUSTER J. WHITE.

REFERENCES CITED

The following references are of record in the file of this patent:

UNITED STATES PATENTS

| Number | Name | Date |
| --- | --- | --- |
| 595,700 | Davis | Dec. 21, 1897 |
| 981,515 | Anderson | Jan. 10, 1911 |
| 1,829,500 | Brown | Oct. 27, 1931 |
| 1,834,427 | Schumacher | Dec. 1, 1931 |
| 2,264,923 | Waseige | Dec. 2, 1941 |
| 63,596 | Wilson | Apr. 2, 1867 |

FOREIGN PATENTS

| Number | Country | Date |
| --- | --- | --- |
| 682,948 | France | Feb. 24, 1930 |
| 324,772 | Germany | Sept. 6, 1920 |